(12) United States Patent
Mitsui et al.

(10) Patent No.: US 7,771,697 B2
(45) Date of Patent: Aug. 10, 2010

(54) METHOD FOR PREPARING FUNCTIONAL NANOMATERIALS UTILIZING ENDOTHERMIC REACTION

(75) Inventors: Tadashi Mitsui, Ibaraki (JP); Takashi Sekiguchi, Ibaraki (JP); Mika Gamo, Ibaraki (JP); Yafei Zhang, Ibaraki (JP); Toshihiro Ando, Ibaraki (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1216 days.

(21) Appl. No.: 10/495,045

(22) PCT Filed: Nov. 12, 2002

(86) PCT No.: PCT/JP02/11784

§ 371 (c)(1),
(2), (4) Date: May 11, 2004

(87) PCT Pub. No.: WO03/042099

PCT Pub. Date: May 22, 2003

(65) Prior Publication Data

US 2005/0002849 A1    Jan. 6, 2005

(30) Foreign Application Priority Data

Nov. 12, 2001    (JP) ............................. 2001-346418

(51) Int. Cl.
*D01F 9/12*    (2006.01)
(52) U.S. Cl. .................. 423/447.3; 423/447.1; 977/843
(58) Field of Classification Search ............... 423/447.1, 423/447.3, 447.2; 977/842–848
See application file for complete search history.

(56) References Cited

U.S. PATENT DOCUMENTS

| | | | | |
|---|---|---|---|---|
| 5,641,466 A * | 6/1997 | Ebbesen et al. | .......... | 423/447.2 |
| 5,747,161 A * | 5/1998 | Iijima | .......... | 428/367 |
| 6,156,256 A * | 12/2000 | Kennel | .......... | 264/461 |
| 6,333,016 B1 * | 12/2001 | Resasco et al. | .......... | 423/447.3 |
| 6,759,025 B2 * | 7/2004 | Hong et al. | .......... | 423/447.3 |

(Continued)

FOREIGN PATENT DOCUMENTS

JP    2003-012312    1/2003

OTHER PUBLICATIONS

Brown, LeMay & Bursten, Chemistry The Central Science, pp. 149-150 (7th ed., Prentice-Hall, Inc. 1997).*

(Continued)

*Primary Examiner*—Stanley S. Silverman
*Assistant Examiner*—Daniel C. McCracken
(74) *Attorney, Agent, or Firm*—Westerman, Hattori, Daniels & Adrian, LLP

(57) ABSTRACT

A method is disclosed whereby a functional nanomaterial such as a monolayer carbon nanotube, a monolayer boron nitride nanotube, a monolayer silicon carbide nanotube, a multilayer carbon nanotube with the number of layers controlled, a multilayer boron nitride nanotube with the number of layers controlled, a multilayer silicon carbide nanotube with the number of layers controlled, a metal containing fullerene, and a metal containing fullerene with the number of layers controlled is produced at a high yield. According to the method, when a multilayer carbon nanotube (3) is formed by a chemical vapor deposition or a liquid phase growth process, an endothermic reaction aid ($H_2S$) is introduced in addition to a primary reactant ($CH_4$, $H_2$) in the process to form a monolayer carbon nanotube (4).

3 Claims, 6 Drawing Sheets

U.S. PATENT DOCUMENTS 6,884,405 B2 * 4/2005 Ryzhkov .................. 423/447.1

OTHER PUBLICATIONS

Mitsui, et al., Structure of Frilled Carbon Nanowires Synthesized by Sulfur-assisted Chemical Vapor Deposition, Mat. Res. Soc. Symp. Proc. vol. 706, Z3.10.1-Z3.10.6 (2002).*

Gogotsi, et al., Hydrothermal synthesis of multiwall carbon nanotubes, J. Mater. Res. 2000; 15(12): 2591-2594.*

Jeong, et al., A new purification method of single-wall carbon nanotubes using H2S and O2 mixture gas, Chem. Phys. Ltrs. 2001; 244: 18-22.*

Cummings, et al. Peeling and sharpening multiwall nanotubes, Nature 2000; 406: 586.*

Ebbesen, et al., Large Scale Synthesis of Carbon Nanotubes, Nature 1992; 358: 220-222.*

Wang, et al., Field emission from nanotube bundle emitters at low fields, Appl. Phys. Lett. 1997; 70(24): 3308-3310.*

Yoshinori Ando; Journal of the Crystallographic Society of Japan, vol. 43, pp. 353-359, Oct. 31, 2001. Cited in the PCT search report.

Tak Jeong et al.; Chemical Physics Letters, Elsevier, vol. 344, pp. 18-22, Aug. 17, 2001. Cited in the PCT search report.

P. M. Ajayan et al.; Nature, vol. 362, pp. 522-525, Apr. 8, 1993. Cited in the PCT search report.

S. C. Tsang et al.; Nature, vol. 362, pp. 520-522, Apr. 8, 1993. Cited in the PCT search report.

Jie Liu et al.; Science, vol. 280, pp. 1253-1256, May 22, 1998. Cited in the PCT search report.

K. Hirahara et al.; Physical Review Letters, vol. 85, No. 25, pp. 5384-5387, Dec. 18, 2000. Cited in the PCT search report.

Morishita et al. "*Scanning Electron Microscope Observation of the Purification Behaviour of Carbon Nanotubes*" Journal of Materials Science 34 (1999), pp. 1169-1174.

Hernadi et al. "*Reactivity of Different Kinds of Carbon During Oxidative Purification of Catalytically Prepared Carbon Nanotubes*" Solid State Ionics 141-142 (2001), pp. 203-209.

Mitsui et al. "*Structure of Frilled Carbon Nanowires Synthesized by Sulfur-assisted Chemical Vapor Deposition*" Mat. Res. Soc. Symp. Proc. vol. 706—2002 Materials Research Society, pp. 49-54.

Mitsui et al. "*An Artificial Carbon Nano-Thorn Synthesized by a Plasma Chemical Vapour Deposition*" J. Phys. D: Appl. Phys. 39 (2006), pp. 3337-3341.

Zhang et al. "*A Novel Synthesis Method for Aligned Carbon Nanotubes in Organic Liquids*" Jpn. J. Appl. Phys. vol. 41 (2002), pp. L408-L411.

Zhang et al. "*Synthesis of 3C-SiC Nanowhiskers and Emission of Visible Photoluminescence*" Jpn. J. Appl. Phys. vol. 91 (2002), pp. 6066-6070.

Kiyoharu Nakagawa et al., "Synthesis of Nano-structured Carbons in Organic Liquids by Solid-Liquid Interface Catalytic Vapor Deposition", English Translation of Material Japan, vol. 43, No. 3, pp. 218-224, 2004.

Supplemental European Search Report dated Jul. 27, 2009, issued in corresponding Application No. EP 02 77 8100.

Kitiyanan B et al."Controlled Production of Single-Wall Carbon Nanotubes by Catalytic Decomposition of CO on Bimetallic Co-Mo Catalysts" Chemical Physics Letters, vol. 317, pp. 497-503, Feb. 4, 2000, XP002149234.

Hongjie Dai et al. "Single-Wall Nanotubes Produces by Metal-Catalyzed Disproportionation of Carbon Monoxide", Chemical Physics Letters, vol. 260, pp. 471-475, Sep. 27, 1996 XP000610009.

* cited by examiner (a) PRIOR ART (b)

ST1

ST2

ST3

(a)

(b)

METHOD FOR PREPARING FUNCTIONAL NANOMATERIALS UTILIZING ENDOTHERMIC REACTION

TECHNICAL FIELD

The present invention relates to methods of making a functional nano material such as a monolayer nanotube, a multilayer nanotube in which the number of layers is controlled, a metal containing fullerene and a multilayered metal containing fullerene.

BACKGROUND ART

Nanotubes such as carbon nanotubes, boron nitride nanotubes and silicon nitride nanotubes, which possess a unique and microfine structure, are attracting much attention as a material capable of exhibiting an unprecedented new function.

While nanotubes include a monolayer nanotube with its outer wall made of one layer and a multilayer nanotube with its outer wall made of a plurality of layers, monolayer nanotubes have been found to exhibit an especially excellent function. For example, carbon nanotubes which have negative electron affinity exhibit excellent properties as an electron emissive material that emits electrons by field emission. Since their efficiency of electron emission depends on the curvature of their tips, nanotubes which are monolayer excel over multilayer nanotubes which are larger in diameter. It has become evident that a cold cathode tube using monolayer nanotubes has an extremely low threshold voltage and a light emitting device using such a cold cathode tube has an emission quantum efficiency that exceeds that of a GaN light emitting diode which presently is said to be extraordinarily high.

Also, in order to raise the mechanical strength of a metal or a synthetic resin, it has so far been customary to compound it with a fiber reinforcement material into a composite material. For example, use has been made of glass fibers and carbon fibers and more recently of multilayer carbon nanotubes as the material reinforcement. The smaller the fibers or tubes in size and the greater the uniformity of their distribution, it is known that the greater is the mechanical strength increased. If monolayer carbon nanotubes which are smaller in diameter are replaced for the multilayer carbon nanotubes, there should then ensue a further increase in the mechanical strength.

Also, while hydrogen is expected to be a major fuel in the future, it is difficult to store it safely and at high density. A method has so far been proposed using a hydrogen storage alloy of nickel family but this method has failed to be put to practical use because of the weight of nickel and its low ratio of weight to energy density. On the other hand, while monolayer nanotubes which are hydrogen absorptive and extremely low in weight are expected to be an excellent hydrogen storage material, this hydrogen storage material has not been put to practical use either because of extreme difficulties which have so far been encountered to mass-produce monolayer nanotubes.

Further, while metal containing fullerene is a functional nano-material that is similar in structure to nanotubes, it, too, has failed to be put to practical use because of the difficulty of producing fullerene of a particular structure at a satisfactory yield. Metal containing fullerene is useful as a catalyst in various technical fields due to its unique structure. The type of metal included in the fullerene will determine the situations in which it may be utilized as a catalyst.

In order to form monolayer carbon nanotubes, a method has been proposed in which a multilayer carbon nanotube produced is heat-treated in a plasma of oxygen, carbon dioxide or hydrogen to gasify multi-wall graphite layers of the multilayer carbon nanotube, thus forming a single-walled carbon nanotube. See J. Mater. Sci. 34, 1169 (1999). In this method, however, the graphite layers are gasified through an exothermic reaction whose rate of reaction changes rapidly, making it difficult to control the number of the layers to be gasified, and the gasification does not proceed uniformly over the entire product. Thus, the method has presented the problem that its yield is extremely low.

A method has also been proposed in which an oxidizing agent such as $KMnO_4$, $H_2O_2$, $O_3$ or $HClO_4$ is used to gasify the multi-walled graphite layers of a multilayer carbon nanotube, forming a single-walled or monolayer carbon nanotube. See Solid State Ionics 141-142, 203 (2001).

In this method of using an oxidizing agent, however, the structure of a carbon nanotube is liable to change and it is hard to form a monolayer carbon nanotube of perfect structure at an acceptable yield.

Thus, while monolayer nanotubes or metal containing fullerene are hoped for as new materials capable of exhibiting various new functions, there has so far been made no method available that can be used to make them at low cost, namely at an industrially acceptable yield.

DISCLOSURE OF THE INVENTION

With the aforementioned prior-art problems taken into account, the present invention has for its objects to provide a method of making at a high yield a functional nanomaterial such as a monolayer carbon nanotube, a monolayer boron nitride nanotube, a monolayer silicon carbide nanotube, a multilayer carbon nanotube with the number of layers controlled, a multilayer boron nitride nanotube with the number of layers controlled and a multilayer silicon carbide nanotube with the number of layers controlled, a metal containing fullerene, and a metal containing fullerene with the number of layers controlled, the method utilizing endothermic reactions.

In order to achieve the object mentioned above, there is provided in accordance with the present invention a method of making a functional nanomaterial utilizing endothermic reactions, characterized in that when a multilayer carbon nanotube is formed by a chemical vapor deposition process or a liquid phase growth process (see Japanese Patent Application 2001-193629, Specification), an endothermic reaction aid is introduced in addition to a primary reactant in the process to form a monolayer carbon nanotube.

The chemical vapor deposition process may here be a process that uses, e.g., a combination of a volatile hydrocarbon and hydrogen as the primary reactant which is excited in the presence of fine iron particles as a catalyst in microwave plasma to form a multilayer carbon nanotube.

The liquid phase growth process may be a process that uses, e.g., an organic liquid as the primary reactant and heats the organic liquid in the presence of fine iron particles as a catalyst to form a multilayer carbon nanotube.

The endothermic reaction aid may comprise, e.g., any one or any combination of hydrogen sulfide ($H_2S$), carbon monoxide (CO), nitrous oxide ($N_2O$), sulfur (5) and water ($H_2O$).

According to the method with the features mentioned above, monolayer carbon nanotubes can be formed at an improved yield by virtue of the fact that while a carbon nanotube is being grown, the endothermic reaction aid deters the growth of multilayer walls of the carbon nanotube by an impeding reaction accompanied by heat absorption.

The present invention also provides a method of making a functional nanomaterial utilizing endothermic reactions, characterized in that it comprises converting a multilayer nanotube into a monolayer nanotube by heat-treating the multilayer nanotube in a gas or liquid, or a fluid, containing an endothermic reactant.

The endothermic reactant may comprise, e.g., suitably any one or any combination of hydrogen sulfide ($H_2S$), carbon monoxide (CO), nitrous oxide ($N_2O$), sulfur (S) and water ($H_2O$).

The multilayer nanotube may be, e.g., a multilayer carbon nanotube, a multilayer boron nitride nanotube or a multilayer silicon carbide nanotube.

According to these features, the endothermic reactant detaches multilayer walls of the multilayer nanotube through a peeling reaction accompanied by heat absorption. The endothermic reaction allows the rate of the peeling reaction to be well controllable and multilayer nanotubes to be converted into monolayer nanotubes at an extremely high yield.

The present invention further provides a method of making a functional nanomaterial utilizing endothermic reactions, characterized in that it comprises converting a multilayer nanotube into a nanotube with the number of layers desired by heat-treating the multilayer nanotube in a gas or liquid while controlling the amount of the said endothermic reactant in the said gas or liquid.

Here, for the endothermic reactant, use may suitably be made of any one or any combination of hydrogen sulfide ($H_2S$), carbon monoxide (CO), nitrous oxide ($N_2O$), sulfur (S) and water ($H_2O$).

Also, the multilayer nanotube may be a multilayer carbon nanotube, a multilayer boron nitride nanotube or a multilayer silicon carbide nanotube.

According to these method features, multilayer nanotubes can be converted at a high yield into nanotubes each with the number of layers desired by virtue of the fact that changing the amount of the endothermic reactant allows changing the rate of the peeling reaction for each of the multilayer nanotubes controllably.

The present invention also provides a method of making a functional nanomaterial utilizing endothermic reactions, characterized in that it comprises heat-treating a metal containing monolayer nanotube in a gas or liquid containing an endothermic reactant to cut or disintegrate the metal containing monolayer nanotube into metal containing fullerenes, thereby forming a metal containing fullerene.

Here, for the endothermic reactant, use may suitably be made of any one or any combination of hydrogen sulfide ($H_2S$), carbon monoxide (CO), nitrous oxide ($N_2O$), sulfur (S) and water ($H_2O$).

Also, the monolayer nanotube may be a monolayer carbon nanotube, a monolayer boron nitride nanotube or a monolayer silicon carbide nanotube.

Further, the contained metal may be, e.g., gadolinium (Gd).

According to these features, the endothermic reactant cuts the graphite wall between metal and metal of the monolayer nanotube through a shrinking reaction accompanied by heat absorption to form metal containing fullerenes. Thus, a metal containing fullerene can be formed at an extremely high yield.

The present invention further provides a method of making a functional nanomaterial utilizing endothermic reactions, characterized in that it comprises heat-treating a multilayer nanotube that contains a metal in a gas or liquid containing an endothermic reactant to cut or disintegrate the multilayer nanotube into multilayer metal containing fullerenes, thereby forming a metal containing fullerene covered with multilayer walls.

For the endothermic reactant, use is preferably made of any one or any combination of hydrogen sulfide ($H_2S$), carbon monoxide (CO), nitrous oxide ($N_2O$), sulfur (S) and water ($H_2O$).

Also, the multilayer nanotube may be, e.g., a multilayer carbon nanotube, a multilayer boron nitride nanotube or a multilayer silicon carbide nanotube. The metal may be, e.g., gadolinium (Gd).

According to these features, the endothermic reactant cuts multilayer walls between metal and metal of the multilayer nanotube through a shrinking reaction accompanied by heat absorption to form fullerenes each having a metal containing fullerene contained therein and covered with multilayer walls. Thus, multilayer metal containing fullerenes can be formed at an extremely high yield.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof. In the drawings.

(1) Hydrogen sulfide:methane:hydrogen=0.000:0.500:99.500, (2) Hydrogen sulfide:methane:hydrogen=0.100:1.000:98.900 and (3) Hydrogen sulfide:methane:hydrogen=0.255:0.500:99.245, respectively;

where the ratio is mole ratio, and all other conditions are identical.

Figure 2:
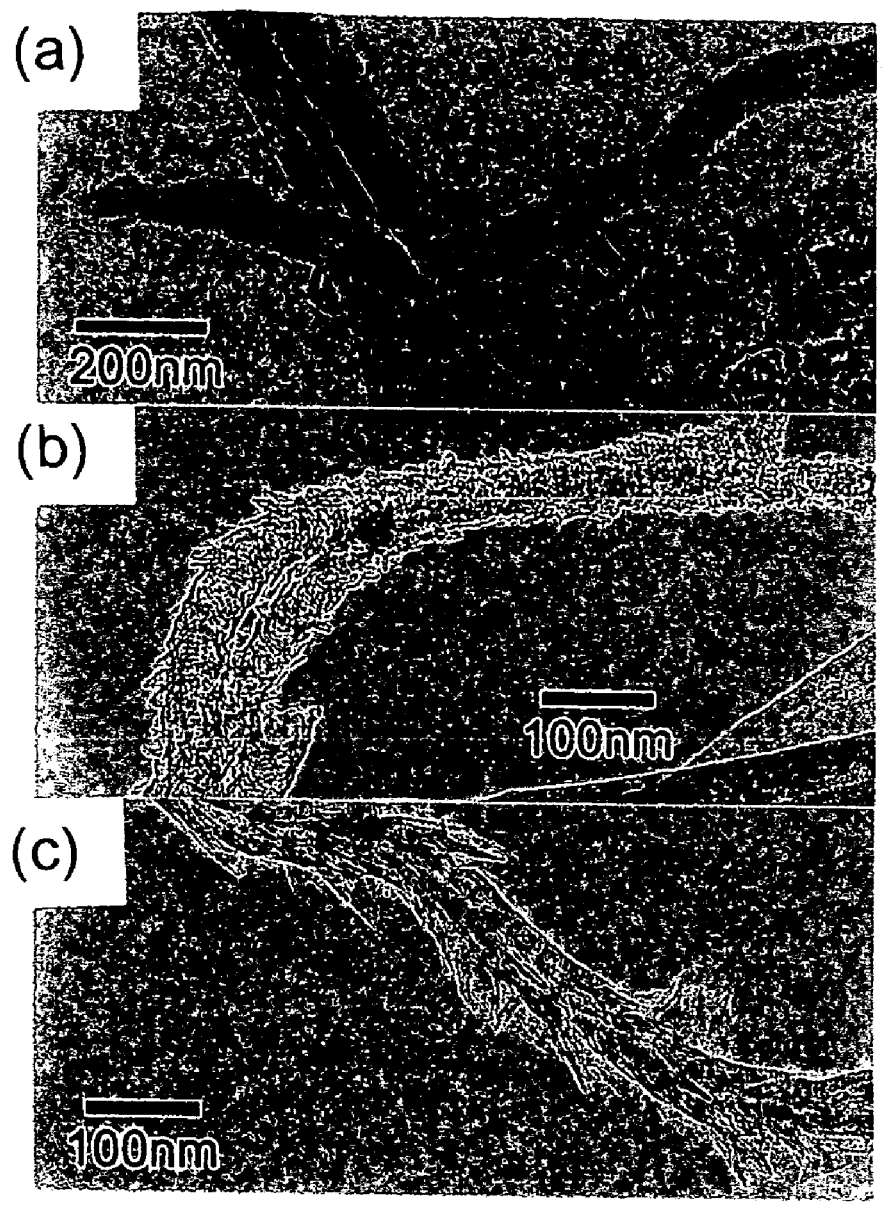
FIG. 2 shows pictures (a), (b) and (c) taken by a transmission electron microscope of carbon nanotube specimens formed with varied proportions of a primary reactant and a reaction aid under conditions.
Figure 3:
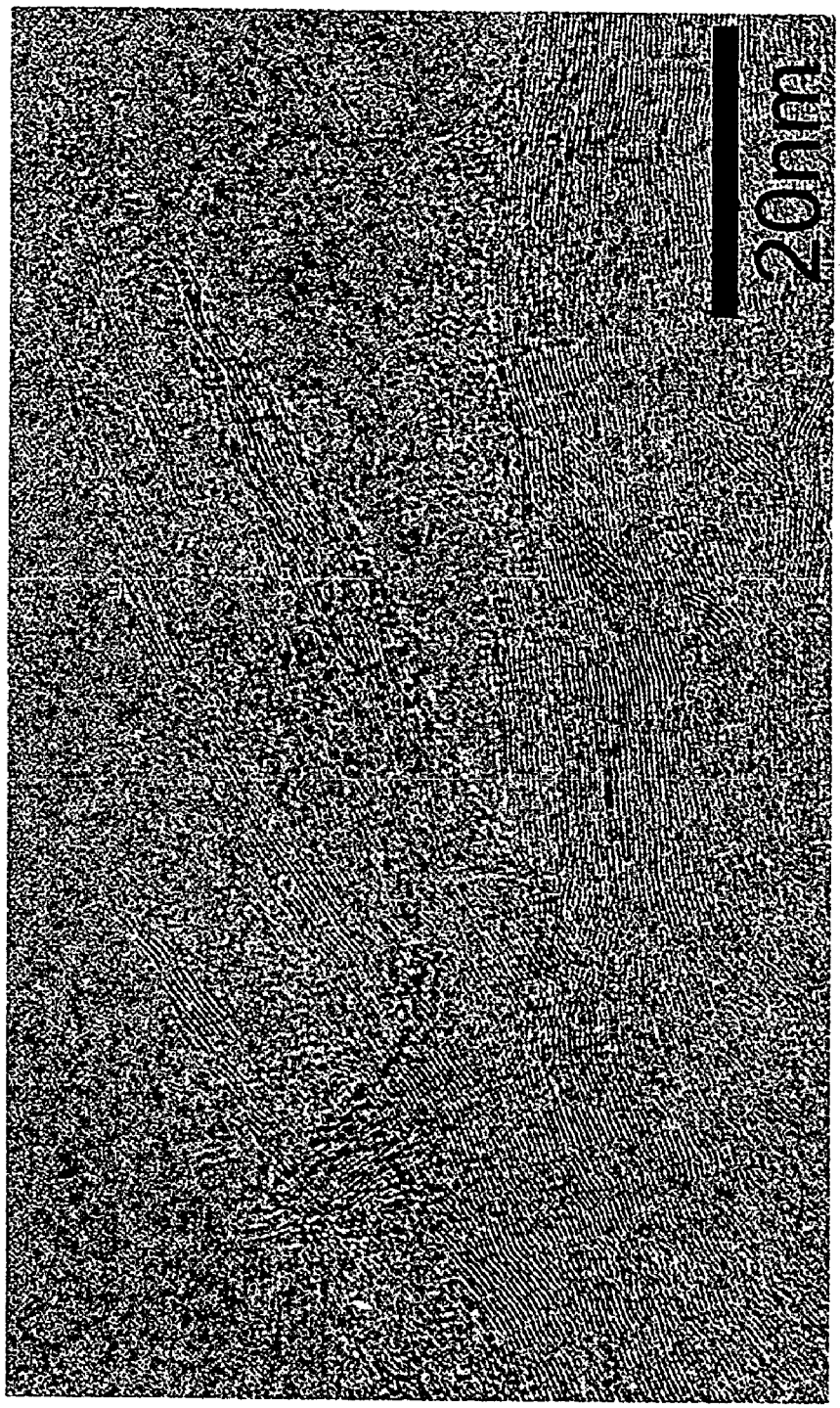
Figure 4:
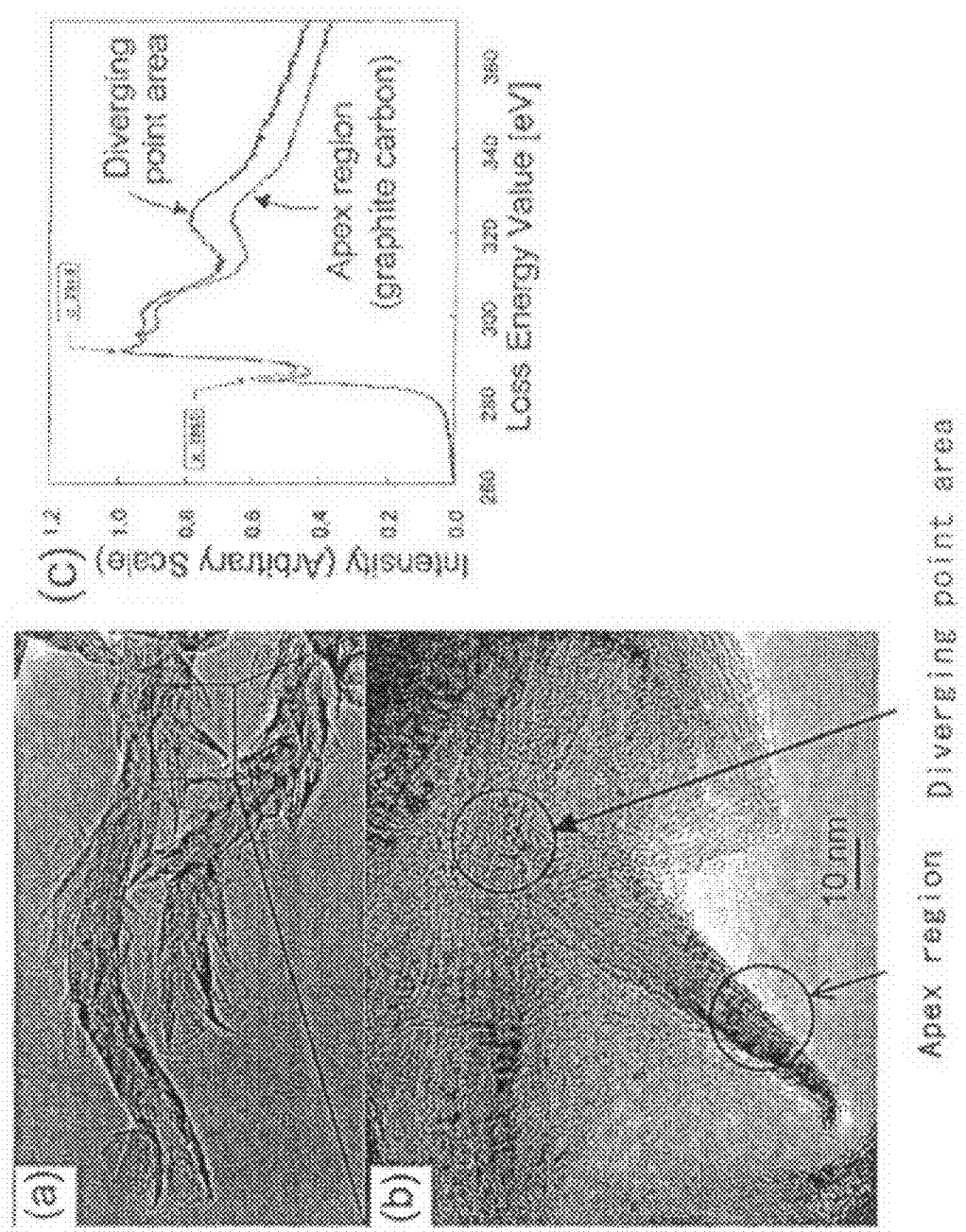
Figure 5:
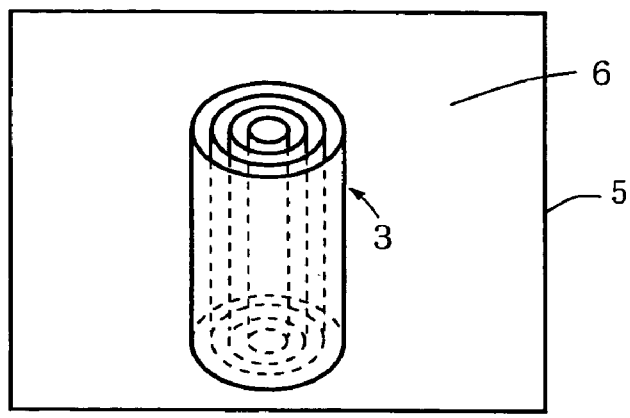
Figure 5:
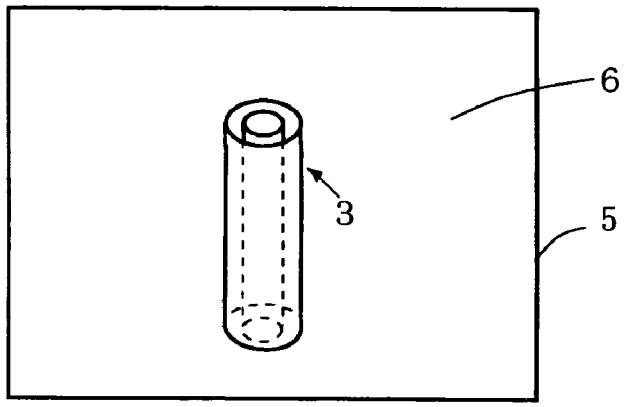
Figure 5:
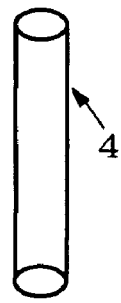
Figure 6:
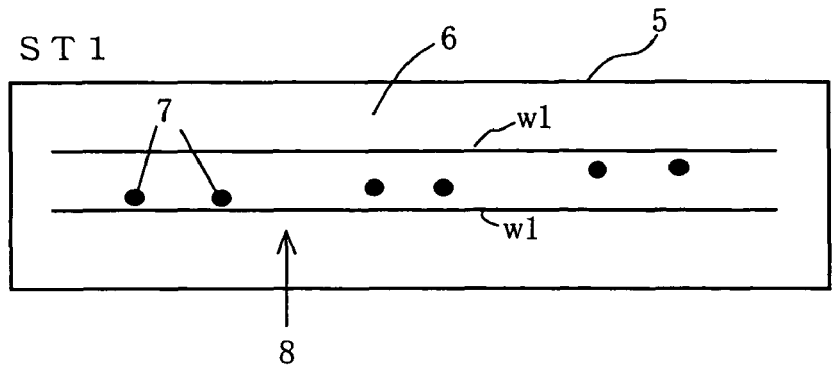
Figure 6:
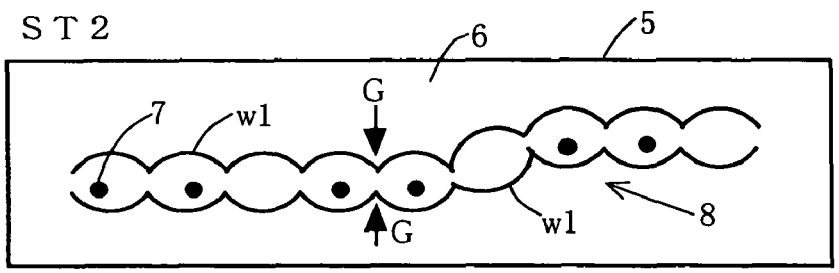
Figure 6:
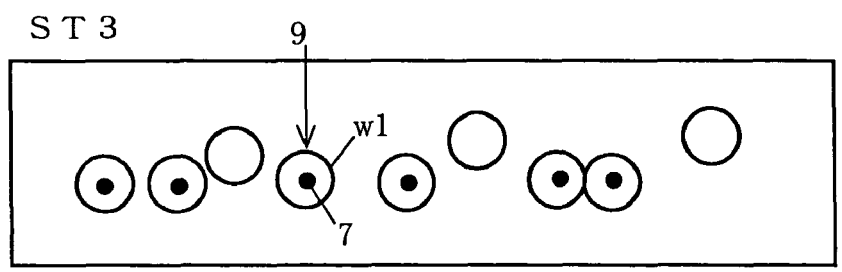
Figure 6:
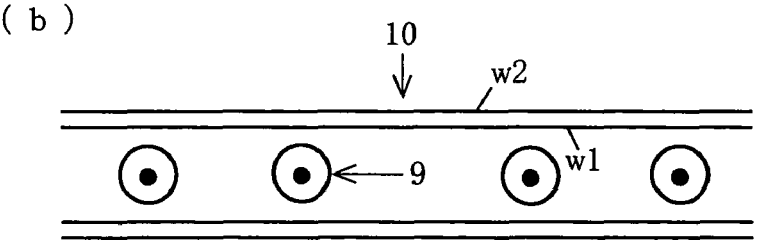
Figure 6:
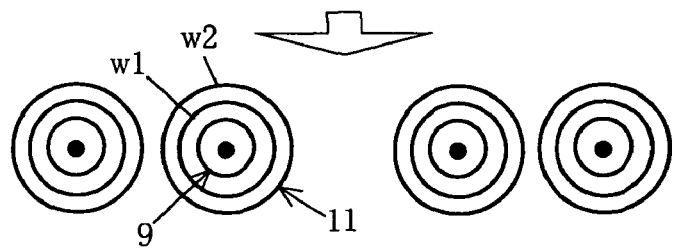

FIG. 3 shows a high resolution picture taken by the transmission electron microscope of frills shown in FIG. 2(c);

FIG. 4 illustrates structures of an apex region and a diverging point area of a frill as shown in FIG. 2(c) wherein FIG. 4(a) is a low magnification picture taken by the transmission electron microscope of the monolayer nanotube shown in FIG. 2(c), FIG. 4(b) is a high magnification picture taken by the transmission electron microscope of a frill as shown circled in FIG. 4(a), and FIG. 4(c) is a diagram showing results of measurement by electron energy loss spectroscopy (EELS) of the apex region and diverging point area shown in FIG. 4(b);

FIG. 5 illustrates a method and a mechanism whereby a multilayer carbon nanotube is converted into a monolayer carbon nanotube in accordance with the present invention; and FIG. 6 typically illustrates a method and a mechanism whereby a metal containing fullerene is formed in accordance with the present invention wherein FIG. 6(a) shows the case that it is formed from a metal containing monolayer carbon nanotube and FIG. 6(b) shows the case that it is formed from a carbon nanotube containing a metal containing fullerene.

BEST MODES FOR CARRYING OUT THE INVENTION

Hereinafter, the present invention will be described in detail with reference to suitable forms of implementation thereof illustrated in the drawing figures.

At the outset, mention is made of a method of making a functional nanomaterial utilizing endothermic reactions in accordance with the present invention as set forth in the appended claims.

This method allows a monolayer carbon nanotube to be formed at an improved yield.

Figure 1:
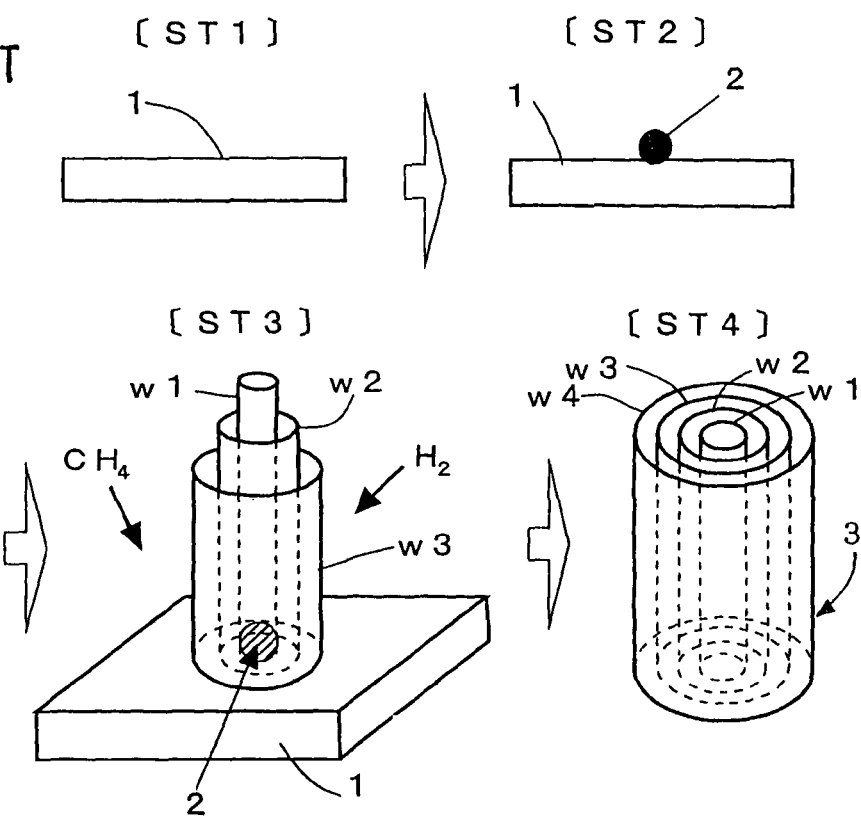
FIGS. 1 (a) and (b) are diagrams illustrating a method of making a monolayer carbon nanotube in accordance with the present invention and a mechanism whereby a monolayer carbon nanotube is formed in accordance therewith.
Figure 1:
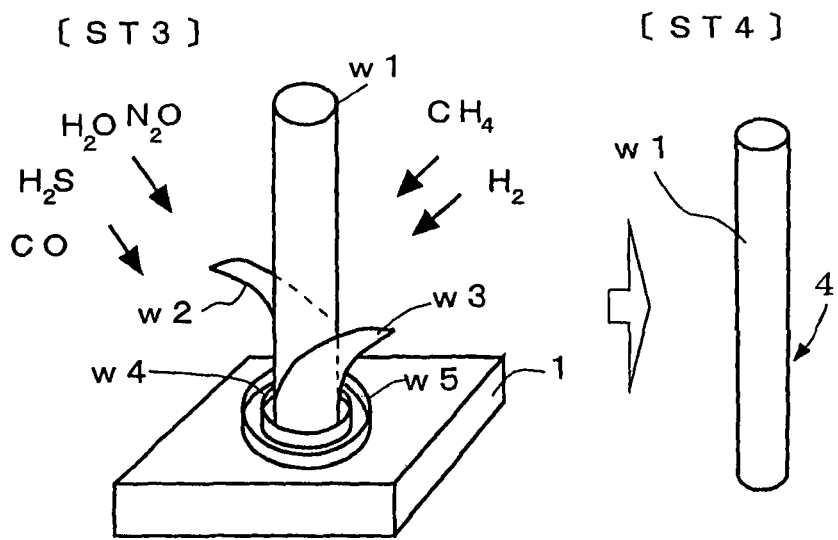

FIG. 1 is a diagram illustrating a method of making a monolayer carbon nanotube in accordance with the present invention and a mechanism whereby a monolayer carbon nanotube is formed in accordance therewith. FIG. 1(a) shows steps in a chemical vapor deposition process performed without adding any endothermic reaction aid and a mechanism whereby a multilayer carbon nanotube is then formed while FIG. 1(b) shows steps in the chemical vapor deposition process performed by adding an endothermic reaction aid and a mechanism whereby a monolayer carbon nanotube is then formed.

Referring to FIG. 1(a), ST1 shows a step of cleaning a substrate 1 that is a diamond, Si or like substrate which may be cleaned by washing with an organic liquid and heat-treatment in a reducing atmosphere. ST2 shows a step in which a fine iron particle as a catalytic particle 2 is attached to the substrate 1, e.g., by applying the former to the latter. Alternatively, a thin film of iron may be formed on the substrate 1 which may then be heat-treated in a reducing atmosphere to convert the film into a fine iron particle or particles 2. ST3 shows a step in which a carbon nanotube is grown by the chemical vapor deposition process. It is also shown typically there that from the fine iron particle 2 as a nucleus on the substrate 1 there is grown a multilayer carbon nanotube 3 comprising cylinders w1, w2 and w3 made of graphite, and coaxial with, and different in diameter from, one another.

As shown at ST3, if the substrate 1 having the fine iron particle 2 attached thereto is placed in a microwave plasma from gases of methane ($CH_4$) and hydrogen ($H_2$) as primary reactants, then from the nucleus of fine iron particle 2 there are grown vertically to the substrate 1 the graphite cylinders w1, w2 and w3 coaxial with and different in diameter from one another, thus forming a multilayer carbon nanotube 3. Shown at ST4 is a structure of the multilayer carbon nanotube 3 which comprises the graphite cylinders w1, w2 and w3 formed.

Thus, the use of primary reactants alone forms a multilayer carbon nanotube.

FIG. 1(b) illustrates a method of forming a monolayer carbon nanotube in accordance with the present invention. Steps ST1 and ST2 then also included are omitted from illustration since they are identical to those in FIG. 1(a).

ST3 in FIG. 1(b) differs from ST3 in FIG. 1(a) in that growth is effected in a plasma in which in addition to the primary reactant there is introduced a reaction aid such as comprising one or more of $N_2O$, $H_2O$, $H_2S$, and $CO$.

In this case, as shown by ST3 in FIG. 1(b), of the graphite cylinders w1, w2, w3, w4, and w5 only the cylinder w1 at the center is grown while the other cylinders are little grown. To wit, the cylinders w2 and w3 are split from the cylinder w1 to commence growing in directions other than the direction in which the cylinder w1 is grown but to cease growing soon. Further graphite cylinders w4 and w5 which commence growing from the substrate 1 while surrounding the cylinder w1 cease growing soon and little grow. In this manner, the monolayer carbon nanotube 4 is grown. This phenomenon is deemed to be due to the fact that the endothermic reactant brings about a splitting reaction that fragments the graphite cylinders as well as a terminating reaction that terminates the growth of the split or fragmented graphite cylinders.

Thus, monolayer carbon nanotubes can be produced at a high yield in accordance with the present method in which a monolayer carbon nanotube is formed with the use of an endothermic reactant bringing about the endothermic splitting and terminating reactions and thus the impeding reactions which deter the growth of multilayer walls.

Although the method is mentioned above as using a chemical vapor deposition process, it should be noted that a liquid phase growth process may be used in the method to likewise form a monolayer carbon nanotube. The liquid phase growth process differs from the chemical vapor deposition process in that an organic liquid is used as the primary reactant. The use of the organic liquid having a reaction aid or aids such as $N_2O$, $H_2O$, $H_2S$, and $CO$ added thereto allows the above mentioned splitting and terminating reactions to be brought about to form a monolayer carbon nanotube. Thus, monolayer carbon nanotubes can be formed at a high yield here, too.

Although the explanation is given above as to five graphite cylinders w1-w5, they can be more or less than five.

Mention is next made of Example 1.

Example 1 was carried out to demonstrate that a monolayer carbon nanotube can be produced by a method of making a functional nanomaterial utilizing endothermic reactions in accordance with the present invention as set forth in the appended claims.

Washed with an organic, a diamond single crystal (100) faced substrate was introduced into an ultrahigh vacuum CVD growth apparatus in which it is cleaned by heating it to a temperature of 800° C. using a hydrogen plasma whereafter iron (Fe) as a catalyst is vapor-deposited thereon, which becomes a fine iron particle of nanometer order in size by a high temperature for growing a carbon nanotube prior to its growth.

The ultrahigh vacuum CVD growth apparatus in which this substrate was placed was supplied with methane and hydrogen gases as primary reactants and alternatively with the primary reactants and hydrogen sulfide gas as a reaction aid to create a microwave plasma each therein in order to grow carbon nanotubes, respectively. Their appearances were compared with each other by a transmission electron microscope.

Three specimen making conditions set forth below are adopted.

(1) Hydrogen sulfide:methane:hydrogen=0.000:0.500:99.500

(2) Hydrogen sulfide:methane:hydrogen=0.100:1.000:98.900

(3) Hydrogen sulfide:methane:hydrogen=0.255:0.500:99.245 where the ratio is mole ratio, and all other conditions are identical.

FIG. 2 shows pictures (a), (b), and (c) taken by the transmission electron microscope of carbon nanotube specimens formed with varied proportions of the primary reactants and the reaction aid under conditions (1), (2), and (3) above, respectively.

In FIG. 2(a), a carbon nanotube is seen which extends leftwards from upper right. This carbon nanotube is seen from the Figure to have its diameter reaching about 70 nm and it is also seen to be a multilayer carbon nanotube from the electron beam transmission intensity ratio.

In FIG. 2(b), a carbon nanotube is seen which rises from lower left and then extends rightwards and is frilled like a cornhusk. As is apparent from the Figure, this carbon nanotube is seen to have a diameter of about 40 nm and it is also seen to be a monolayer carbon nanotube from the electron beam transmission intensity ratio.

In FIG. 2(c), a carbon nanotube is seen which is frilled like a cornhusk. As is apparent from the Figure, this carbon nanotube is seen to have a diameter of about 40 nm and it is also seen to be a monolayer carbon nanotube from the electron beam transmission intensity ratio. This carbon nanotube is also seen to be greater in both frill density and size than that in FIG. 2(b).

Mention is next made of these frills.

FIG. 3 shows a high resolution picture taken by the transmission electron microscope of the frills shown in FIG. 2(c). As is apparent from the Figure, the frills exhibit interference fringes integral with the interference fringes of the nanotube which are due to graphite lattices, indicating that the frills are portions of the nanotube wall and not what may have been deposited on the nanotube.

FIG. 4 illustrates structures of an apex region and a diverging point area of a frill as shown in FIG. 2(c) wherein FIG. 4(a) is a low magnification picture taken by the transmission electron microscope of the monolayer nanotube shown in FIG. 2(c), FIG. 4(b) is a high magnification picture taken by the transmission electron microscope of a frill as shown circled in FIG. 4(a) and FIG. 4(c) is a diagram showing results of measurement by electron energy loss spectroscopy (EELS) of the apex region and diverging point area shown in FIG. 4(b). In FIG. 4(c), the electron loss energy value (eV) is plotted along the abscissa axis and the number of electrons having such loss energy values, namely their intensity is plotted along the ordinate axis. Here, the spectrum shown is normalized by a peak intensity of 291.6 eV, namely the loss peak intensity based on the σ bond of carbons.

As is apparent from FIG. 4(c), the apex region is greater than the diverging point area in the peak corresponding to 285.0 eV, namely the loss peak based on the π bond of carbons. This indicates that the apex region is composed almost of graphite carbon whereas the diverging point area is composed of diamond carbon. See Appl. Phy. Lett. 78, 3358 (2001).

This in turn indicates that the frills are grown upon splitting from the wall of the carbon nanotube. Further, that the frills are short indicates that the graphite layers which are grown upon splitting are caused to cease growing by a terminating reaction.

In the absence of adding an endothermic reactant aid, these graphite layers, namely the frills, would form or become multilayer walls of a multilayer carbon nanotube.

From FIGS. 2 to 4, it is thus seen that when a carbon nanotube is formed by a chemical vapor deposition process, introducing an endothermic reaction aid in addition to a primary reactant or reactants causes endothermic splitting and terminating reactions to take place to form a monolayer carbon nanotube in which the growth of multilayer walls is deterred.

Further, when such nanotubes as formed under the condition (3) mentioned above were distributed as a reinforcing material in an aluminum (Al) matrix to form a composite material, the composite material was found to be 2.1 times greater in mechanical strength than a composite material formed by distributing conventional multilayer nanotubes as the reinforcing material in the aluminum matrix.

This enormous effect is considered to arise from the fact that a monolayer nanotube formed under the condition (3) is smaller in diameter than multilayer nanotubes and further has frills extending in directions obliquely from its wall, thus bringing about an anchor effect.

The present method is thus seen to allow a monolayer nanotube to be mass-produced in an extremely simple way and at low cost and to be exploited in various fields of industry for its excellent properties.

An explanation is next given in respect of a method of making a functional nanomaterial utilizing endothermic reactions in accordance with the present invention as set forth in the appended claims. This method permits converting multilayer carbon nanotubes into monolayer carbon nanotubes at a high yield.

FIG. 5 illustrates a method and a mechanism whereby a multilayer carbon nanotube is converted into a monolayer carbon nanotube in accordance with the present invention.

Referring to FIG. 5, in step ST1 a multilayer carbon nanotube 3 is loaded in a sealed vessel 5 such as a fused silica tube that is resistant to high temperature and corrosion, which is charged with an endothermic reaction aid 6, for example hydrogen sulfide ($H_2S$), and sealed and in which the multilayer carbon nanotube 3 is heat-treated at a selected temperature. Here, the multilayer carbon nanotube may be any multilayer carbon nanotube formed in any way whatsoever. In step ST2, the multilayer carbon nanotube 3 is shown whose multilayer walls are stripped one by one. In step ST3, a monolayer carbon nanotube 4 is shown that is formed as a final product from the multilayer carbon nanotube 3 when its multilayer walls except one are stripped.

This method differs from that shown in and described in connection with FIG. 1 in that it does not use any principal reactant such as methane or hydrogen. If the principal reactant is not included, then instead of the splitting and terminating reactions, a reaction in which the multilayer walls are stripped occurs, namely a stripping reaction, thereby forming the monolayer carbon nanotube 4.

This stripping reaction is also an endothermic reaction. Since the rate of a chemical reaction is proportional to $\exp(-E/kT)$ where E, T and k are activation energy, temperature and Boltzmann's constant, respectively, the rate of reaction where the temperature is lowered by an endothermic reaction changes much less than that where the temperature is raised by an exothermic reaction. Since the rate of reaction is thus much more controllable in the present method, monolayer carbon nanotubes can be formed here at an improved yield.

Although the present method is described above as applied to a carbon nanotube, the method can be applied to a boron nitride nanotube and a silicon carbide nanotube as well.

Also, since changing the amount of an endothermic reaction aid 6 introduced allows changing the rate of stripping reaction, it is evidently possible to produce a multilayer nanotube with a desired number of layers by controlling the amount of an endothermic reaction aid introduced. For example, with a fixed time period for heat treatment, the amount of an endothermic reaction aid 6 can be controlled to form multilayer nanotubes with a desired number of layers at a high yield.

Also, the endothermic reaction aid 6 may be any one or any combination of $N_2O$, $H_2O$, $H_2S$ and $CO$.

Also, while mention is made above of a carbon nanotube, the present method can be applied to a boron nitride nanotube and a silicon carbide nanotube as well.

Next, Example 2 is shown.

Example 2 was carried out to demonstrate that the present method is capable of forming monolayer carbon nanotubes from multilayer carbon nanotubes.

Multilayer carbon nanotubes bulk-produced and trial-sold were reacted with hydrogen sulfide in a silica tube. The vacuum in the silica tube before it was charged with hydrogen sulfide had an ultimate value of $1 \times 10^{-6}$ Pa, hydrogen sulfide was charged at a pressure of $1 \times 10^{-4}$ Pa, and the multilayer carbon nanotubes were heat treated at a temperature of 230° C. or more.

More than 45% of the multilayer carbon nanotubes were found to have been converted into monolayer carbon nanotubes. When these carbon nanotubes were used as a hydrogen occluding material to occlude hydrogen, it had a weight by energy density ratio about 1.05 times greater than that of a hydrogen occluding nickel alloy.

The present method is thus seen to allow making monolayer nanotubes from multilayer nanotubes in an extremely simple way and at a high yield. Since multilayer nanotubes can be mass-produced at low cost by a conventional method, the use of the present method in conjunction with multilayer nanotubes produced by such a conventional method allows a monolayer nanotube to be mass-produced in an at extremely low cost and to be exploited in various fields of industry for its excellent properties.

An explanation is next given in respect of a method of making a functional nanomaterial utilizing endothermic reactions in accordance with the present invention as set forth in the appended claims.

According to these methods, a metal containing and a multilayer metal containing fullerene can be produced at an improved yield.

FIG. 6 typically illustrates a method and a mechanism whereby a metal containing fullerene is formed in accordance with the present invention wherein FIG. 6(*a*) shows the case that it is formed from a metal containing monolayer carbon nanotube and FIG. 6(*b*) shows the case that it is formed from a carbon nanotube containing a metal containing fullerene.

Referring to FIG. 6(*a*), as shown at ST1 a monolayer nanotube 8 containing a metal 7 is loaded in the sealed vessel 5 shown in and described in connection with FIG. 5. The vessel 5 is charged with an endothermic reaction aid 6 and then tightly sealed, in which the metal containing nanotube 8 is heat-treated at a selected temperature. As shown at ST2, as the heat treatment proceeds each of graphite layers G between metal 7 and metal 7 shrinks gradually. At last, the monolayer nanotube 8 is disintegrated or fragmented into metal containing fullerenes 9, namely fullerenes each of which contains metal 7 as shown at ST3.

Mention is next made of forming a multilayer metal containing fullerene.

Referring to FIG. 6(*b*), a carbon nanotube 10 that contains metal containing fullerenes 9 is loaded in the sealed vessel 5 as in FIG. 6(*a*). The vessel 5 is charged with an endothermic reaction aid 6 and then tightly sealed, in which the fullerene containing nanotube 10 is heat treated at a selected temperature. As mentioned in connection with FIG. 6(*a*), as the heat treatment proceeds each of graphite layers between metal and metal in the carbon nanotube 10 shrinks gradually. At last, the carbon nanotubes 10 are disintegrated or fragmented into multilayer metal containing fullerenes 11, namely fullerenes each of which contains a metal containing fullerene.

The reaction aid 6 mentioned above may be any one or any combination of $N_2O$, $H_2O$, $H_2S$, and CO.

Also, while mention is made above of a carbon nanotube, the present method can be applied to a boron nitride nanotube and a silicon carbide nanotube as well.

Next, Example 3 is shown.

Example 3 was carried out to demonstrate that the present method is capable of forming a metal containing fullerene or a multilayer metal containing fullerene.

A monolayer carbon nanotube containing Gd (gadolinium) metal atoms was reacted with hydrogen sulfide in a silica tube. The vacuum in the silica tube before it was charged with hydrogen sulfide had an ultimate value of $1 \times 10^{-6}$ Pa, hydrogen sulfide was charged at a pressure of $1 \times 10^{-4}$ Pa, and the monolayer carbon nanotube was heat treated at a temperature of 230° C. or more.

While a yield of 100% was not achieved since Gd metal atoms are not equi-distantly spaced apart in the monolayer carbon nanotube, metal containing fullerenes were obtained which correspond to about 20.5% of the Gd metal atoms in number.

Also, when a multilayer carbon nanotube that contains Gd metal containing fullerenes was likewise processed, multilayer metal containing fullerenes were obtained which correspond to about 5 to 8% of the Gd metal containing fullerenes in number.

The present method is thus seen to allow forming metal containing fullerenes in an extremely simple way and at a high yield. Since monolayer nanotubes can be mass-produced at low cost by a method according to the present invention, since multilayer nanotubes can be mass-produced at low cost by a conventional method, and since a multilayer nanotube with the number of layers controlled can be mass-produced by a method according to the present invention, the use of the present method in conjunction with monolayer or multilayer nanotubes produced by a suitable one of these methods allows a fullerene to be mass-produced at an extremely low cost and to be exploited in various fields of industry for its excellent properties.

Further, while mention is made above of an embodiment in which a nanotube is heat-treated in a sealed vessel charged with a reaction aid in implementing the methods according to the present invention, results are likewise obtained in another embodiment in which a nanotube is heat-treated in a gas flow of the reaction aid or in a flow of a gaseous mixture of the reaction aid with another gas.

INDUSTRIAL APPLICABILITY

As will be appreciated from the foregoing description, a monolayer carbon nanotube, a monolayer boron nitride nanotube, a monolayer silicon carbide nanotube, a multilayered carbon nanotube with the number of layers controlled, a multilayered boron nitride nanotube with the number of layers controlled, a multilayered silicon carbide nanotube with the number of layers controlled, a metal containing fullerene, and a metal containing fullerene with the number of layers controlled can be formed at high yield according to the present invention.

While monolayer nanotubes and fullerenes are highly expected for future use as a new functional material for their unique properties, they have never been exploited industrially since no other method has been known that can produce them at an extremely low yield. The present invention providing methods whereby they can be produced at high yield, namely can be mass-produced at extremely low cost, opens the way to the industrial utilization of monolayer nanotubes and fullerenes.

What is claimed is:

1. A method of making a functional nanomaterial comprising converting a multilayer nanotube into a monolayer nanotube by heat-treating the multilayer nanotube in a gas phase comprising at least one reactant selected from the group consisting of hydrogen sulfide ($H_2S$), carbon monoxide (CO), nitrous oxide ($N_2O$), and sulfur (S), whereby multilayer walls are stripped from the multilayer nanotube to thereby form a monolayer nanotube.

2. A method of making a functional nanomaterial as set forth in claim 1, wherein said multilayer nanotube is a multilayer carbon nanotube, a multilayer boron nitride nanotube or a multilayer silicon carbide nanotube.

3. The method of making a functional nanomaterial as set forth in claim 1, wherein said multilayer nanotube is a multilayer carbon nanotube, said reactant is hydrogen sulfide ($H_2S$), and said heat-treatment temperature is 230° C. or higher.

* * * * *